United States Patent
Abe et al.

(10) Patent No.: US 7,236,319 B2
(45) Date of Patent: Jun. 26, 2007

(54) REPRODUCING METHOD, REPRODUCING APPARATUS, RECORDING AND REPRODUCING APPARATUS, AND MAGNETIC RECORDING MEDIUM

(75) Inventors: Naoto Abe, Kanagawa (JP); Takeshi Nagata, Kanagawa (JP); Hisashi Osawa, Ehime (JP); Yoshihiro Okamoto, Ehime (JP)

(73) Assignee: Fujifilm Corporation, Tokyo (JP)

( * ) Notice: Subject to any disclaimer, the term of this patent is extended or adjusted under 35 U.S.C. 154(b) by 220 days.

(21) Appl. No.: 11/147,159

(22) Filed: Jun. 8, 2005

(65) Prior Publication Data
US 2006/0279868 A1    Dec. 14, 2006

(51) Int. Cl.
G11B 5/035    (2006.01)
(52) U.S. Cl. ............................................. 360/65
(58) Field of Classification Search ............. 360/65, 360/39, 29, 46
See application file for complete search history.

(56) References Cited

U.S. PATENT DOCUMENTS

| 7,006,317 | B1 * | 2/2006 | Hennecken et al. | 360/65 |
| 7,023,634 | B2 * | 4/2006 | Takeo | 360/39 |
| 2003/0128453 | A1 * | 7/2003 | Saito et al. | 360/65 |
| 2004/0169946 | A1 * | 9/2004 | Uno et al. | 360/39 |
| 2005/0094304 | A1 * | 5/2005 | Ohkubo et al. | 360/65 |
| 2005/0117243 | A1 * | 6/2005 | Serizawa | 360/65 |
| 2005/0190477 | A1 * | 9/2005 | Taguchi et al. | 360/46 |
| 2005/0213241 | A1 * | 9/2005 | Cideciyan et al. | 360/65 |
| 2005/0219727 | A1 * | 10/2005 | Kajiwara et al. | 360/39 |
| 2005/0225888 | A1 * | 10/2005 | Nagata et al. | 360/29 |
| 2006/0119969 | A1 * | 6/2006 | Hutchins et al. | 360/65 |
| 2006/0232871 | A1 * | 10/2006 | Brittenham | 360/65 |

FOREIGN PATENT DOCUMENTS

JP    2002-157827 A    5/2002

* cited by examiner

*Primary Examiner*—Fred F. Tzeng
(74) *Attorney, Agent, or Firm*—Sughrue Mion, PLLC

(57) ABSTRACT

A recording and reproducing apparatus includes: a recording section for recording an information signal in a magnetic recording medium in which a magnetic layer containing hexagonal ferrite is formed; and a reproducing section for reproducing the information signal recorded in the magnetic recording medium, the reproducing section including: a reproducing head for reading the information signal from the magnetic recording medium; and an equalizer for equalizing the information signal read from the magnetic recording medium, wherein in the equalized information signal, coefficients a, b, c, d of PR(1, a, b, c, d) meet conditions that $0.1 \leq a < 2.0$, $-0.9 \leq b < -0.0$, $-2.0 < c \leq -0.3$, and $-1.0 < d \leq -0.1$. A corresponding reproducing method, a corresponding reproducing apparatus, and the magnetic recording medium are also disclosed.

20 Claims, 4 Drawing Sheets

FIG. 4

| NORMALIZED LINE DENSITY K | COEFFICIENT a | COEFFICIENT b | COEFFICIENT c | COEFFICIENT d | BER at PR(1,a,b,c,d) | BER at PR(1,2,0,-2,-1) | COMPARISON WITH PR(1,2,0,-2,-1) | BER ≦1E-04 |
|---|---|---|---|---|---|---|---|---|
| 2.3 | 0.1 | -0.7 | -0.3 | -0.3 | <1E-06 | <1E-06 | ○ | ○ |
| 2.6 | 0.5 | -0.9 | -0.5 | -0.1 | <1E-06 | <1E-06 | ○ | ○ |
| 3.1 | 0.8 | -0.7 | -0.8 | -0.3 | <1E-06 | <1E-06 | ○ | ○ |
| 3.4 | 0.9 | -0.6 | -0.9 | -0.4 | 3.00E-06 | 8.6E-04 | ○ | ○ |
| 3.9 | 0.8 | -0.6 | -0.8 | -0.4 | 4.00E-05 | 4.3E-03 | ○ | ○ |
| 4.7 | 1.0 | -0.5 | -1.0 | -0.5 | 1.00E-04 | 1.7E-02 | ○ | ○ |
| 5.2 | 1.1 | -0.4 | -1.1 | -0.6 | 3.00E-02 | 1.4E-01 | ○ | × |

FIG. 5

| RATIO $\gamma$ | BER RELATIVE VALUE | (ORDER) |
|---|---|---|
| 4.8 | 1.6 | × |
| 9.8 | 1.0 | ○ |
| 14.7 | 0.7 | ○ |
| 20.5 | 0.3 | ○ |
| 25.2 | 0.0 | ○ |
| 30.4 | 0.1 | ○ |
| 36.0 | 0.4 | ○ |
| 40.2 | 0.6 | ○ |
| 44.6 | 0.8 | ○ |
| 51.2 | 1.2 | × |
| 59.6 | 1.6 | × |

REPRODUCING METHOD, REPRODUCING APPARATUS, RECORDING AND REPRODUCING APPARATUS, AND MAGNETIC RECORDING MEDIUM

BACKGROUND OF THE INVENTION

1. Field of the Invention

The present invention relates to a reproducing method, a reproducing apparatus, a recording and reproducing apparatus, and a magnetic recording medium that are all adapted to a high density recording.

2. Description of the Related Art

In recent years, the recording density of magnetic recording media, such as magnetic recording tapes or magnetic disks, has been remarkably increased. Due to such high recording density, various technologies regarding recording and reproducing apparatuses have been conceived, and been in practical use. For example, MR (Magneto Resistive) heads are used as reproducing heads, and a technology for improving the interface between a recording medium and heads is proposed. Furthermore, in a signal processing technology, a PRML system, which combines PR (partial response) system and an ML (Maximum Likelihood) system, is applied to recording and reproducing apparatuses for processing recording media such as magnetic disks, digital video tapes, magnetic tapes for computer backup and optical disks. This PRML system makes it possible to compensate the deterioration in the S/N ratio of recording media because of the high recording density (see U.S. Pat. No. 6,337,889).

Note that U.S. Pat. No. 6,337,889, which is incorporated herein by reference, also discloses the above technology, wherein U.S. Pat. No. 6,337,889 corresponds to Japanese Unexamined Patent Application Publication No. 2002-157827.

Conventionally, in a typical type of magnetic recording media, ones having a magnetic layer containing hexagonal ferrite are used. These media exhibit excellent reproducing output and low noise characteristics in high density recording. However, hexagonal ferrite has a magnetization component of a vertical direction in an in-plane orientation or a random orientation, derived from a crystal structure thereof. Therefore, their isolated inversion reproducing wave has a unique waveform where respective isolated inversion reproducing waveforms in the in-plane orientation and in the vertical direction are added. Consequently, the PRML signal processing system (herein, EEPR4ML: PR(1, 2, 0, −2, −1)) cannot be applied to the above magnetic recording media. This is because the PRML signal processing system is optimized for magnetic recording media in which data is recorded by means of the magnetization in the in-plane orientation. This can be a disadvantage.

Taking this disadvantage into account, the present invention has been conceived. An object of the present invention is to provide a reproducing method and a reproducing apparatus which both allow the PRML signal processing system to be applied suitably to magnetic recording media in which a magnetic layer containing hexagonal ferrite is formed. An additional object of the present invention is to provide a magnetic recording medium that undergoes the PRML signal processing system appropriately with the above method and/or the above apparatus.

SUMMARY OF THE INVENTION

According to an aspect of the present invention, there is provided, a method for reproducing an information signal recorded in a magnetic recording medium in which a magnetic layer containing hexagonal ferrite is formed, the method including:

reproducing the information signal using PR(1, a, b, c, d) ML signal processing, wherein coefficients a, b, c, d of PR(1, a, b, c, d) meet conditions that $0.1 \leq a < 2.0$, $-0.9 \leq b < 0.0$, $-2.0 < c \leq -0.3$, and $-1.0 < d \leq -0.1$.

According to another aspect of the present invention, there is provided, a reproducing apparatus for reproducing, by using PR(1, a, b, c, d) ML signal processing, an information signal recorded in a magnetic recording medium in which a magnetic layer containing hexagonal ferrite is formed, the apparatus including:

a reproducing head for reading the information signal from the magnetic recording medium;

an equalizer for equalizing the information signal read from the magnetic recording medium, wherein in the equalized information signal, coefficients a, b, c, d of PR(1, a, b, c, d) meet conditions that $0.1 \leq a < 2.0$, $-0.9 \leq b < 0.0$, $-2.0 < c \leq -0.3$, and $-1.0 < d \leq -0.1$.

According to still another aspect of the present invention, there is provided, a recording and reproducing apparatus including:

a recording means for recording an information signal in a magnetic recording medium in which a magnetic layer containing hexagonal ferrite is formed; and a reproducing means for reproducing the information signal recorded in the magnetic recording medium, the reproducing means comprising:

a reproducing head for reading the information signal from the magnetic recording medium; and an equalizer for equalizing the information signal read from the magnetic recording medium, wherein in the equalized information signal, coefficients a, b, c, d of PR(1, a, b, c, d) meet conditions that $0.1 \leq a < 2.0$, $-0.9 \leq b < 0.0$, $-2.0 < c \leq -0.3$, and $-1.0 < d \leq -0.1$.

According to yet another aspect of the present invention, there is provided, a magnetic recording medium being used by the above recording and reproducing apparatus With the above reproducing method and reproducing apparatus, the PRML signal processing system can be applied suitably to magnetic recording media in which a magnetic layer containing hexagonal ferrite is formed. In addition, it is possible to provide a magnetic recording medium that undergoes the PRML signal processing system appropriately. This contributes to the high recording density of magnetic recording media.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein:

FIG. 4 is a table illustrating a result of simulation (1) according to one embodiment of the present invention; and FIG. 5 is a table illustrating a result of simulation (2) according to one embodiment of the present invention.

DETAILED DESCRIPTION OF THE EXEMPLARY EMBODIMENTS OF THE INVENTION

Figure 1:
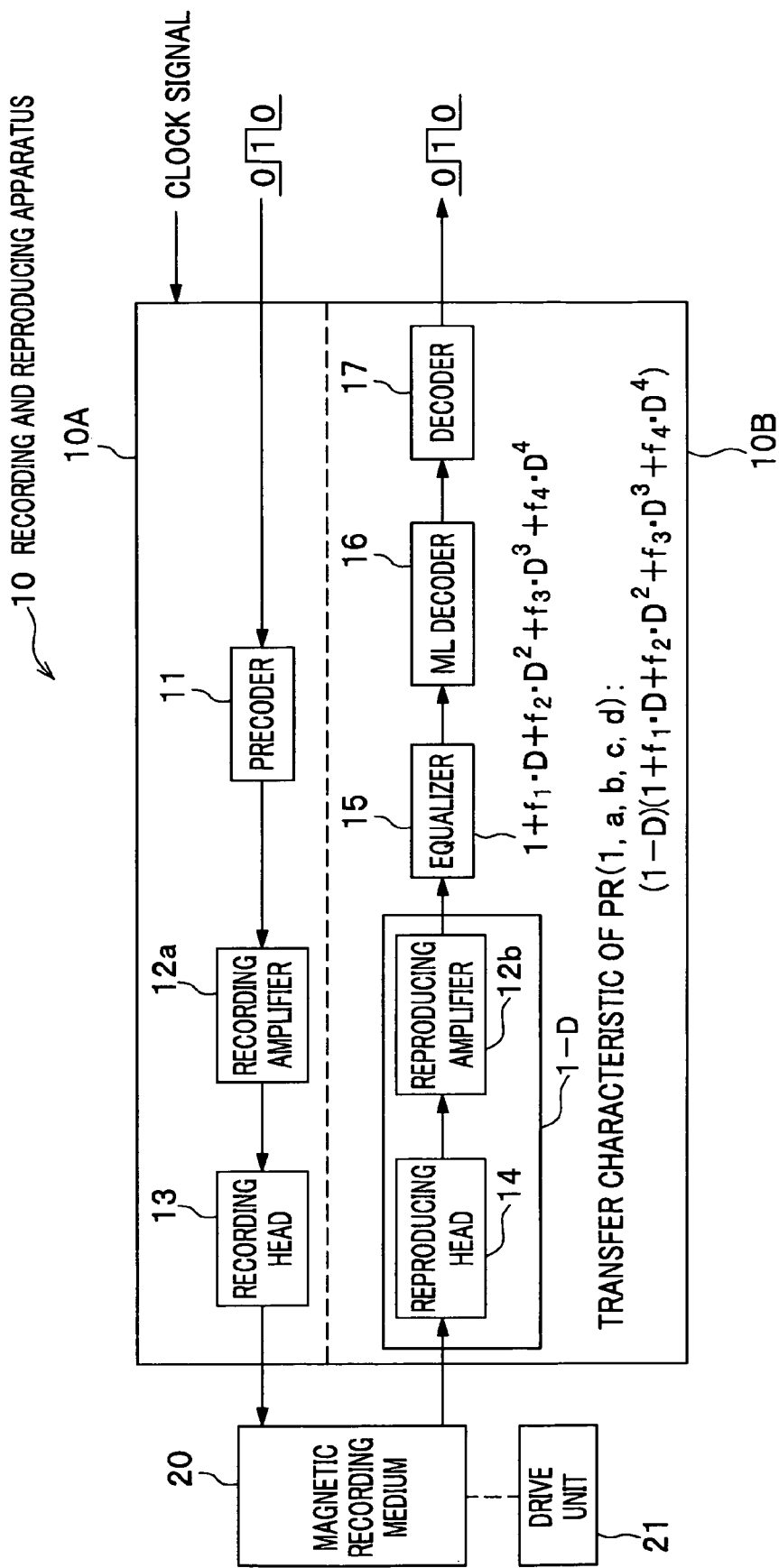
FIG. 1 is a block diagram of a recording and reproducing apparatus according to one embodiment of the present invention.

A magnetic recording medium, a recording and reproducing apparatus, and a reproducing method according to one embodiment of the present invention will be described.

<Magnetic Recording Medium>

A magnetic recording medium according to one embodiment of the present invention includes a base (support body), at least one non-magnetic layer, and at least one magnetic layer. The non-magnetic and magnetic layers are laminated on either surface or both surfaces of the base. The base may have the shape of a tape or flexible disk, for example. The base may be a film made of a synthetic resin such as polyethylene terephthalate, polyethylene, polypropylene, polycarbonate, polyethylene naphthalate, polyamide, polyamide imide, polyimide, polysulfone, or polyethersulfone. Alternatively, the base may be a film or plate made of a metal such as aluminum or stainless steel.

It is preferable that the magnetic recording medium includes a back layer on an opposite side to the magnetic layer, if being brought into contact with a recording head or reproducing head. With the back layer, the contact property of the base with the head is improved.

The magnetic recording medium may further include layers other than the non-magnetic, magnetic and back layers. Examples of these layers may include a soft magnetic layer containing a soft magnetic powder, a second magnetic layer, a cushion layer, an overcoat layer, an adhesion layer and a protection layer. These layers can be provided at proper positions so as to fulfill their functions efficiently. The thickness of the magnetic layer is preferably 10 to 300 nm, more preferably 10 to 200 nm, and most preferably 10 to 100 nm. In addition, the thickness of the non magnetic layer may be 0.5 to 3 μm. Note that the non-magnetic layer is preferable to be thicker than the magnetic layer.

<Hexagonal Ferrite>

The magnetic recording layer is formed of hexagonal ferrite. Examples of hexagonal ferrite include, but not limited to, barium ferrite, strontium ferrite, lead ferrite, calcium ferrite, and various substitution materials such as a Co substitution material. More precise example of the hexagonal ferrite includes, but not limited to, magnetoplumbite type barium ferrite, strontium ferrite, magnetoplumbite type ferrite whose particle surface is coated with spinel, compound magnetoplumbite type barium ferrite, and strontium ferrite that partially contain a spinel phase. Furthermore, the hexagonal ferrite may contain some predetermined elements, as well as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb atoms. Generally, the hexagonal ferrite powder to which Co—Zn, Co—Ti, Co—Ti—Zr, Co—Ti—Zn, Nb—Zn—Co, Sn—Zn—Co, Sn—Co—Ti or Nb—Zn is added may be used. In addition, W-type hexagonal ferrite can also be used. Some hexagonal ferrite powders may contain specific impurities generated depending on their ingredients and/or manufacturing methods. These hexagonal ferrites are used in the form of a hexagonal platy powder.

In reproducing a high density recording medium using an MR head, a noise can be reduced and a higher S/N ratio can be obtained by forming the average plate diameter and plate thickness of particles of the hexagonal ferrite magnetic powder to equal to/less than 50 nm and 15 nm, respectively. The specific surface area of each particle formed by the BET method is typically 30 to 200 $m^2/g$, preferably 50 to 100 $m^2/g$. The specific surface area roughly accords with a value calculated based on the diameter and plate thickness of each particle. The narrower the distribution of a product of a plate diameter and a plate thickness is, the more preferable it is. Although the distribution is not always a normal one, it is expressed as σ/(average plate diameter or average plate thickness)=0.1 to 0.5 if calculated and expressed in a standard deviation for a powder size. In order to make a powder particle size distribution sharper, the powder generation-reaction system is made uniform as much as possible, and the generated powder undergoes a distribution improvement treatment. This treatment maybe a method for dissolving an ultra fine powder selectively in an acid solution, for example. Alternatively, the treatment is the vitrification-crystallization method by which a uniform powder is obtained by performing heat treatments plural times and separating nucleus generation and growth. Although the coercivity Hc of a magnetic powder can be formed to 40 to 400 kA/m, it is preferable that Hc is 144 to 300 kA/m. The higher Hc is more advantageous in high density recording, but the Hc is limited by the ability of a recording head. The Hc can be controlled by the powder particle size (the product of a plate diameter and a plate thickness), the types and amounts of contained elements, substitution sites of elements, powder generation-reaction conditions, and the like.

The saturation magnetization σS of the hexagonal ferrite magnetic powder is preferably 30 to 70 $A \cdot m^2/kg$. The finer a powder becomes, the smaller the σS tends to become.

The magnetic recording medium including a coating type barium ferrite (BaFe) magnetic layer is excellent in a reproducing output in high density recording (specifically linear recording density exceeding 100 kfci), and has a low noise characteristic. The coating type barium ferrite (BaFe) magnetic layer is formed by coating, on a base, dispersion liquid containing a barium ferrite powder of hexagonal ferrite. More specifically, it is formed using a barium ferrite material with the plate diameter of not more than 40 nm, <PR(1, a, b, c, d) ML Signal Processing>

The PR(1, a, b, c, d) ML signal processing reproduces a signal sequence showing a maximum likelihood by using inter-code interference occurring in a high density recording. The signal sequence is represented in PR(1, a, b, c, d).

On the basis of the above-mentioned PRML (Partial Response Maximum Likelihood) signal processing, a description will be given below, of a reproducing method, a reproducing apparatus, a recording and reproducing apparatus, and a recording medium which are all according to one embodiment of the present invention.

A recording and reproducing apparatus 10 includes, as shown in FIG. 1, a recording section 10A and a reproducing section 10B, and thus, a reproducing apparatus can be obtained by omitting the recording section 10A from the recording and reproducing apparatus 10. Similarly, the recoding section 10A can be obtained by omitting the reproducing section 10B from the recording and reproducing apparatus 10. A magnetic recording medium 20 may be driven by a drive unit 21. More specially, if the recording medium 20 is a tape, the drive unit 21 drives reels (not shown) and a capstan roller (not shown) that travels the tape at desired speeds. If the magnetic recording medium 20 is a disk, the drive unit 21 rotates the disk and controls a position of a head (not shown) with respect to the disk. The magnetic recording medium 20 may be either removal (for example, a floppy disk drive and a hard disk drive) from or fixed (for example a hard disk drive) to the drive unit 21.

The recording and reproducing apparatus 10 records data, such as the information signal, in a magnetic recording medium 20, and reproduces data from the magnetic recoding medium 20 by means of the PR(1, a, b, c, d)ML signal process. In this embodiment, a magnetic recording medium in which barium ferrite (BaFe) is formed as the magnetic layer is prepared.

The recording and reproducing apparatus 10 includes a precoder 11, a recording amplifier 12a and a recording head 13 as the recording section 10A, and further includes a reproducing head 14, a reproducing amplifier 12b, an equalizer 15, a maximum likelihood decoder (ML decoder) 16 and a decoder (demodulation circuit) 17 as the reproducing section 10B.

The precoder 11 is provided upstream of where the data is recorded, thus preventing the error propagation of data during demodulation.

The recording amplifier 12a amplifies the coded information signal having been coded by the precoder 11. The recording head 13 magnetizes the barium ferrite formed in the magnetic layer of the magnetic recording medium 20 to thereby record the data of a predetermined clock cycle (bit length) in the medium 20.

The reproducing head 14 makes contact with the magnetic layer of the magnetic recording medium 20 to thereby read a magnetization change of the magnetic layer, so that an analog reproducing signal is produced. The analog reproducing signal is obtained by differentiating a signal recorded in the magnetic layer of the magnetic recording medium 20, and is expressed in a transfer characteristic of (1−D). The reproducing amplifier 12b amplifies the signal having been detected by the reproducing head 14.

Figure 2:
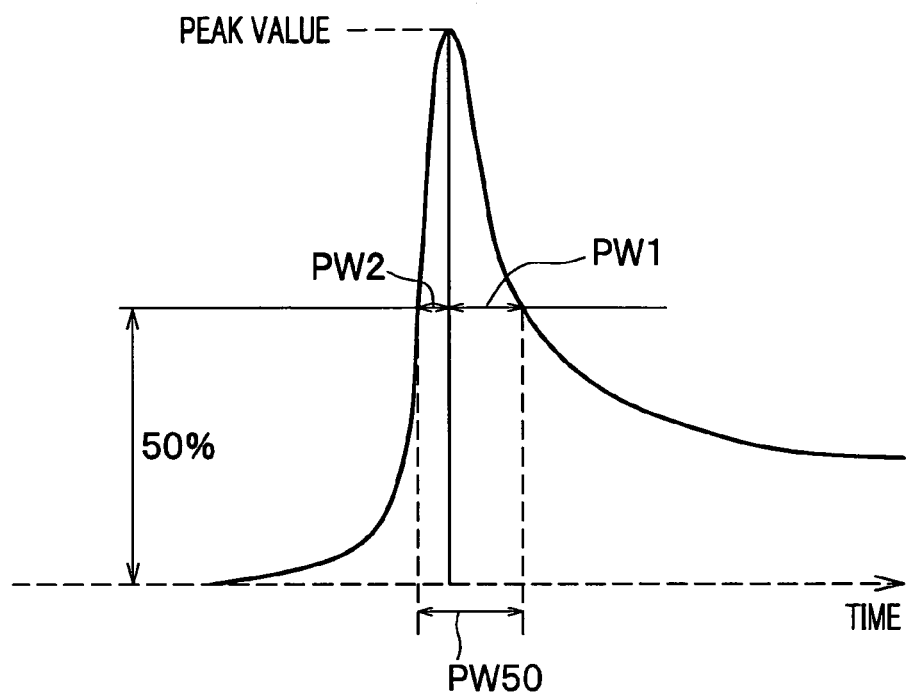
FIG. 2 shows an example of an isolated inversion reproducing waveform occurring in the recording and reproducing apparatus.

An example of a waveform of the analog reproducing signal generated by reading of the reproducing head 14 is shown in FIG. 2. Herein, a description will be given, of an isolated inversion reproducing waveform that is generated at a timing of a rising edge of a pulse signal recorded in the magnetic recording medium 20.

The isolated inversion reproducing waveform shown in FIG. 2 has a peak in a positive direction, and the left and right sides of the peak are asymmetric to each other. In addition, in the isolated inversion reproducing waveform, a right width PW1 of a half-width PW50 is wider than a left width PW2. This is due to the influence of a vertical magnetization component of barium ferrite.

In FIG. 2, the isolated inversion reproducing waveform with the peak in the positive direction is shown as the example of the analog reproducing signal. However, an actual waveform of the analog reproducing signal is composed of the overlapping of two isolated inversion reproducing waveforms with respective peaks in the positive and negative directions. This is because the isolated inversion reproducing waveform with the peak in the negative direction is also generated at a timing of a falling edge of a pulse signal recorded in the magnetic recording medium 20.

Figure 3:
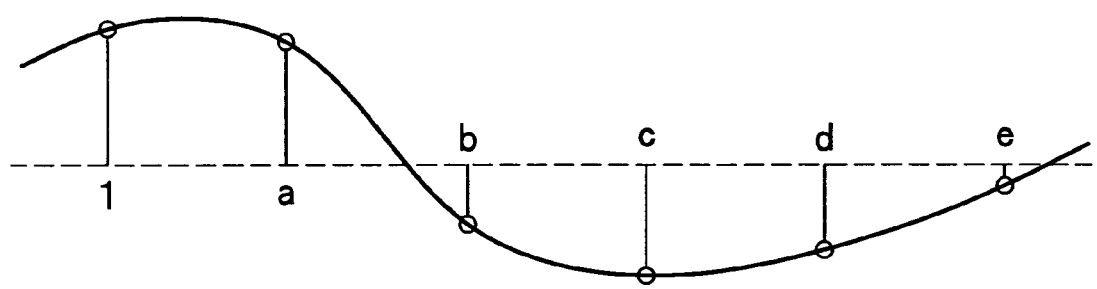
FIG. 3 illustrates a partial response of PR (1, a, b, c, d, e) in the recording and reproducing apparatus shown in FIG. 1.

The equalizer 15 equalizes a signal transferred from the reproducing head 14 through the reproducing amplifier 12b. When a transfer characteristic of PR (1, a, b, c, d) is $1+a \cdot D+b \cdot D^2+c \cdot D^3+d \cdot D^4=(1-D)(1+f_1 \cdot D+f_2 \cdot D^2+f_3 \cdot D^3)$, the equalizer 15 performs an equalization so that the transfer characteristic is expressed in $1+f_1 \cdot D+f_2 \cdot D^2+f_3 \cdot D^3$. Thus, the partial response after the equalization is represented by PR(1, a, b, c, d) shown in FIG. 3. The coefficients a, b, c, d of the PR(1, a, b, c, d) have individual predetermined values. Note that these coefficients a, b, c, d are determined by a simulation (mentioned later).

The maximum likelihood decoder 16 identifies data having been equalized by the equalizer 15. A maximum likelihood decoding is a known technology for detecting a maximum likelihood data sequence, when data, pieces of which have correlation to one another, is recorded/reproduced.

Then, the decoder 17 decodes a signal obtained through PR(1, a, b, c, d) to thereby reproduce an original data (for example, (0, 1, 0)). This allows the data recorded in the magnetic recording medium 20 to be correctly restored to the original data thereof.

<Simulation>

A reproduced waveform recorded in the magnetic recording medium 20 changes differently due to influence from neighbor magnetized areas. Accordingly, simulations (1) and (2) are made using various reproduction waveforms, thereby determining optimum values for the PR(1, a, b, c, d). These optimum values enable a reproduced waveform that has been distorted due to the influence by the neighbor magnetized areas to be reproduced correctly to the original data by using the recording and reproducing apparatus.

<Simulation (1)>

In the simulation (1), it is assumed that a shortest bit length (hereinafter referred to as "bit length") recorded in the magnetic recording medium is T. Then, a normalized line density K, namely, K=[(PW50)/(bit length T)] is varied. For each normalized line density K, coefficients a, b, c, d that can provide the lowest bit error rate are obtained, and the bit error rate under this condition is also obtained. In this case, the bit error rate indicates a ratio of the number of errors to the number of bits in the original signal.

<Target of Simulation (1)>

If the bit error rate obtained for each normalized line density K is more improved than that for each normalized line density K obtained by the general EEPRML method that uses PR(1, 2, 0, −2, −1), then the coefficients a, b, c, d satisfying the condition are determined as preferred optimum coefficients.

Furthermore, if the bit error rate is not greater than $10^{-4}$ (1E-04) upon adaptation of PR (1, a, b, c, d), the coefficients a, b, c, d are determined as more preferable optimum coefficients.

<Result of Simulation (1)>

FIG. 4 shows a result of the simulation (1). In this table, the normalized line density K is varied from 2.3 to 5.2, and the coefficients a, b, c, d and other results are obtained for each normalized line density K.

For example, when the normalized line density K is 2.3, the values of the coefficients a, b, c, d show "0.1", "−0.7", "−0.3", "−0.3", respectively. The resultant bit error rate is less than $10^{-6}$ (1E-06) (see a column of BER at PR (1, a, b, c, d). In other words, the bit error rate in this condition is less than $10^{-4}$ (1E-04), namely, a preferable optimum value. This result is shown as a mark of a circle at the upper rightmost section of the table. In the table, "BER" denotes the bit error rate.

Furthermore, the bit error rate at the normalized line density K of 2.3 is determined to be lower than the bit error rate at the PR(1, 2, 0, −2, −1). This result is shown at the upper second rightmost section with a circular mark.

Consider that the result of the simulation (1) shown in the table of FIG. 4, the bit error rates for all normalized line densities K are lower than those for the PR(1, 2, 0, −2, −1) (see marks of circles at a column indicating comparison results with the normalized PR (1, 2, 0, −2, −1)). Accordingly, the bit error rates for the PR(1, a, b, c, d) are lower than $10^{-4}$ when values of the normalized line density K are "2.3", "2.6", 3.1", "3.4", "3.9", and "4.7", respectively, (see circular marks at the rightmost column in the table).

In consideration of the analysis mentioned above, it can be determined that the values of coefficients a, b, c, d in the PR (1, a, b, c, d) satisfy the conditions that $0.1 \leq a < 2.0$, $-0.9 \leq b < 0.0$, $-2.0 < c \leq -0.3$, and $-1.0 < d \leq -0.1$. Accordingly, it is found that the bit error rate using PR (1, a, b, c, d) is improved compared to that using the normal PR (1, 2, 0, −2, −1). This makes it possible to employ the PRML method suitable for the magnetic recording medium 20 having the crystal structure of the hexagonal ferrite. As a result, it is possible to increase the recording density of magnetic recording media.

Moreover, the values of coefficients a, b, c, d in the PR (1, a, b, c, d) are set to meet the condition that $0.1 \leq a < 2.0$, $-0.9 \leq b < 0.0$, $-2.0 < c \leq -0.3$, and $-1.0 < d \leq -0.1$. Furthermore, the normalized line density K is set such that $K \leq 4.7$ for the optimum PRML. These conditions allow the bit error rate to be less than $10^{-4}$, so that the more preferable PRML method can be applied to the magnetic recording medium 20.

<Simulation (2)>

In simulation (2), the bit error rates are obtained in which a ratio γ (%) indicating a symmetry of the isolated inversion reproducing a waveform shown in FIG. 2 is varied under conditions that PR (1, 0.8, −0.7, −0.8, −0.3) and K=3.1, where γ=[[(PW1)−(PW2)]/(PW50)×100]. Next, a difference is obtained in order between one of a plurality of bit error rates showing the lowest value and each of the bit error rates (hereinafter referred as "BER relative value", wherein "BER" is abbreviation of "bit error rate").

<Target of Simulation (2)>

If the BER relative value obtained for each ratio γ is within 1.0 (order), then it can be determined that the target of the simulation (2) is achieved, and the ratio γ satisfying this condition is defined as an optimum value.

<Result of Simulation (2)>

FIG. 5 shows the result of the simulation (2).

As shown in the table in FIG. 5, the ratio γ varies from 4.8% to 59.6%, and the BER relative value is obtained for each ratio γ. The value of the ratio γ becomes the lowest one when the BER relative value is zero. In this case, the lowest value is 25.2. Further, the range of the γ showing the BER relative values that are within 1.0 order is from 9.8% to 44.6%, wherein the range is indicated with circle marks.

As mentioned above, when the ratio γ satisfies conditions that $9.8 \leq \gamma \leq 50$, the suitable error rate characteristic is provided.

<Prescription of Coating Liquid for BaFe Magnetic Layer>

| | |
|---|---|
| Barium ferrite magnetic powder | 100 parts |
| Urethane resin | 14 parts |
| Mass average molecular weight: 10000 | |
| Sulphonic acid functional group: 0.5 meq/g | |
| Abrasive | 8 parts |
| Carbon black (particle size: 0.015 μm) | 0.5 part |

-continued

<Prescription of Coating Liquid for BaFe Magnetic Layer>

| | |
|---|---|
| #55 (manufactured by Asahi Carbon Co., Ltd) | |
| Stearic acid | 0.5 part |
| Butyl stearate | 2 parts |
| Methyethlketone | 180 parts |
| Cyclohexanone | 100 parts |

<Prescription of Coating Liquid for Non-Magnetic Layer>

| | |
|---|---|
| Non-Magnetic powder: α iron oxide | 100 parts |
| Average primary particle size: 0.09 μm | |
| Specific surface area by BET method: 50 m²/g | |
| pH: 7 | |
| DBP oil absorption amount: 27 to 38 ml/100 g | |
| Surface treatment layer: $Al_2O_3$ exists by 8 mass % for total particles. | |
| Carbon black | 25 parts |
| CONDUCTEX SC-U (manufactured by Colombian Carbon Corp.) | |
| Vinyl chloride copolymer: MR104 (manufactured by ZEON CORP.) | 13 parts |
| Polyurethane resin: UR8200 (manufactured by TOYOBO CO., LTD) | 5 parts |
| Phenyl phosphoric acid | 3.5 parts |
| Butyl stearate | 1 parts |
| Stearic acid | 2 parts |
| Methyethlketone | 205 parts |
| Cyclohexanone | 135 parts |

<Manufacturing of Tape>

According to the prescriptions of the above coating liquid, each constituent was kneaded by a kneader. The obtained kneaded liquid was made to pass by a pump to a horizontal sand mill where beads of 1.0 mm diameter were filled with zirconia of an amount of 80% for a volume of a dispersion unit, was dispersed for 120 minutes (time of substantially staying in the dispersion unit) at 2000 rpm, and thus dispersion liquid for a magnetic layer and one for an non-magnetic layer were adjusted, respectively. Furthermore, to the dispersion liquid for the magnetic layer was added methylethylketone by three parts, the dispersion liquid was filtrated by a filter having an average particle diameter of 1 μm, and thus the coating liquid for forming the magnetic layer was obtained. In addition, to the dispersion liquid for the non-magnetic layer was added polyisocyanate by 2.5 part and moreover methylethylketone by three part, the dispersion liquid was filtrated by a filter with an average particle diameter of 1 μm, and the coating liquid for forming the non-magnetic layer was thus obtained.

The obtained coating liquid for forming the non-magnetic layer was coated and dried on a polyethylene naphthalete of a thickness of 4 μm, so that a thickness of the liquid after drying became 1.5 μm, and thus the non-magnetic layer was formed. After then, the coating liquid for forming the magnetic layer was sequentially coated over the non-magnetic layer so that a thickness of the magnetic layer became 30 to 210 nm; while the magnetic layer was still in a wet state, a BaFe magnetic material within the magnetic layer by a cobalt magnet and solenoid with each magnetic force of 600 mT was in-plane oriented; furthermore a magnetic field was applied in a vertical direction by the cobalt magnet with a magnetic force of 600 mT; thus the magnetic material was obliquely oriented; and the magnetic field in the vertical direction was kept until drying of the magnetic layer was finished. Next, a treatment was performed by a 7-high calendar roll at a temperature of 90 degrees Celsius and a linear pressure of 300 kg/cm (294 kN/m). After then, coating liquid of a prescription below for forming a back layer was coated on an opposite face where the non-magnetic layer and the magnetic layer were formed, the back layer of a thickness of 0.5 μm was formed, and thus a web raw material was obtained.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A method for reproducing an information signal recorded in a magnetic recording medium in which a magnetic layer containing hexagonal ferrite is formed, the method comprising:
    reproducing the information signal using PR(1, a, b, c, d) ML signal processing,
    wherein coefficients a, b, c, d of PR(1, a, b, c, d) meet conditions that $0.1 \leq a < 2.0$, $-0.9 \leq b < 0.0$, $-2.0 < c \leq -0.3$, and $-1.0 < d \leq -0.1$.

2. The method according to claim 1,
    wherein $0.1 \leq a \leq 1.0$, $-0.9 \leq b \leq -0.5$, $-1.0 \leq c \leq -0.3$, and $-0.5 \leq d \leq -0.1$.

3. The method according to claim 2,
    wherein the reproduced information signal shows a normalized line density which meets a condition that $K \leq 4.7$.

4. The method according to claim 3,
    wherein the hexagonal ferrite comprises barium ferrite.

5. The method according to claim 2,
    w wherein an isolated inversion waveform produced when the magnetic recording medium is reproduced shows a ratio γ (%) which indicates an asymmetry and which meets a condition that $9.8 \leq \gamma \leq 50$.

6. The method according to claim 5,
    wherein the hexagonal ferrite comprises barium ferrite.

7. The method according to claim 2,
    wherein the hexagonal ferrite comprises barium ferrite.

8. The method according to claim 1,
    wherein the reproduced information signal shows a normalized line density which meets a condition that $K \leq 4.7$.

9. The method according to claim 8,
    wherein the hexagonal ferrite comprises barium ferrite.

10. The method according to claim 1,
    wherein an isolated inversion waveform produced when the magnetic recording medium is reproduced shows a ratio γ (%) which indicates an asymmetry and which meets a condition that $9.8 \leq \gamma \leq 50$.

11. The method according to claim 10,
    wherein the hexagonal ferrite comprises barium ferrite.

12. The method according to claim 1,
    wherein the hexagonal ferrite comprises barium ferrite.

13. A reproducing apparatus for reproducing, by using PR(1, a, b, c, d) ML signal processing, an information signal recorded in a magnetic recording medium in which a magnetic layer containing hexagonal ferrite is formed, the apparatus comprising:
    a reproducing head for reading the information signal from the magnetic recording medium;
    an equalizer for equalizing the information signal read from the magnetic recording medium,
    wherein in the equalized information signal, coefficients a, b, c, d of PR(1, a, b, c, d) meet conditions that $0.1 \leq a < 2.0$, $-0.9 \leq b < -0.0$, $-2.0 < c \leq -0.3$, and $-1.0 < d \leq -0.1$.

14. The reproducing apparatus according to claim 13,
    wherein $0.1 \leq a \leq 1.0$, $-0.9 \leq b \leq -0.5$, $-1.0 \leq c \leq -0.3$, and $-0.5 \leq d \leq -0.1$.

15. The reproducing apparatus according to claim 14,
    wherein an isolated inversion waveform produced when the magnetic recording medium is reproduced shows a ratio γ (%) which indicates an asymmetry and which meets conditions that $9.8 \leq \gamma \leq 50$.

16. The reproducing apparatus according to claim 15,
    wherein the hexagonal ferrite comprises barium ferrite.

17. The reproducing apparatus according to claim 13,
    wherein an isolated inversion waveform produced when the magnetic recording medium is reproduced shows a ratio γ (%) which indicates an asymmetry and which meets a condition that $9.8 \leq \gamma \leq 50$.

18. The reproducing apparatus according to claim 17,
    wherein the hexagonal ferrite comprises barium ferrite.

19. A magnetic recording medium being used by the recording and reproducing apparatus according to claim 13.

20. A recording and reproducing apparatus comprising:
    a recording means for recording an information signal in a magnetic recording medium in which a magnetic layer containing hexagonal ferrite is formed; and
    a reproducing means for reproducing the information signal recorded in the magnetic recording medium,
    the reproducing means comprising:
        a reproducing head for reading the information signal from the magnetic recording medium; and
        an equalizer for equalizing the information signal read from the magnetic recording medium, wherein in the equalized information signal, coefficients a, b, c, d of PR(1, a, b, c, d) meet conditions that $0.1 \leq a < 2.0$, $-0.9 \leq b < 0.0$, $-2.0 < c \leq -0.3$, and $-1.0 < d \leq -0.1$.

* * * * *